Sept. 30, 1958  S. M. MOBERG  2,854,035
SEALING MACHINE

Filed Sept. 24, 1956  5 Sheets-Sheet 1

INVENTOR:
SIGURD M. MOBERG
BY Robert Henderson

ATTORNEY

Sept. 30, 1958  S. M. MOBERG  2,854,035
SEALING MACHINE

Filed Sept. 24, 1956  5 Sheets-Sheet 2

INVENTOR:
SIGURD M. MOBERG
BY Robert Henderson
ATTORNEY

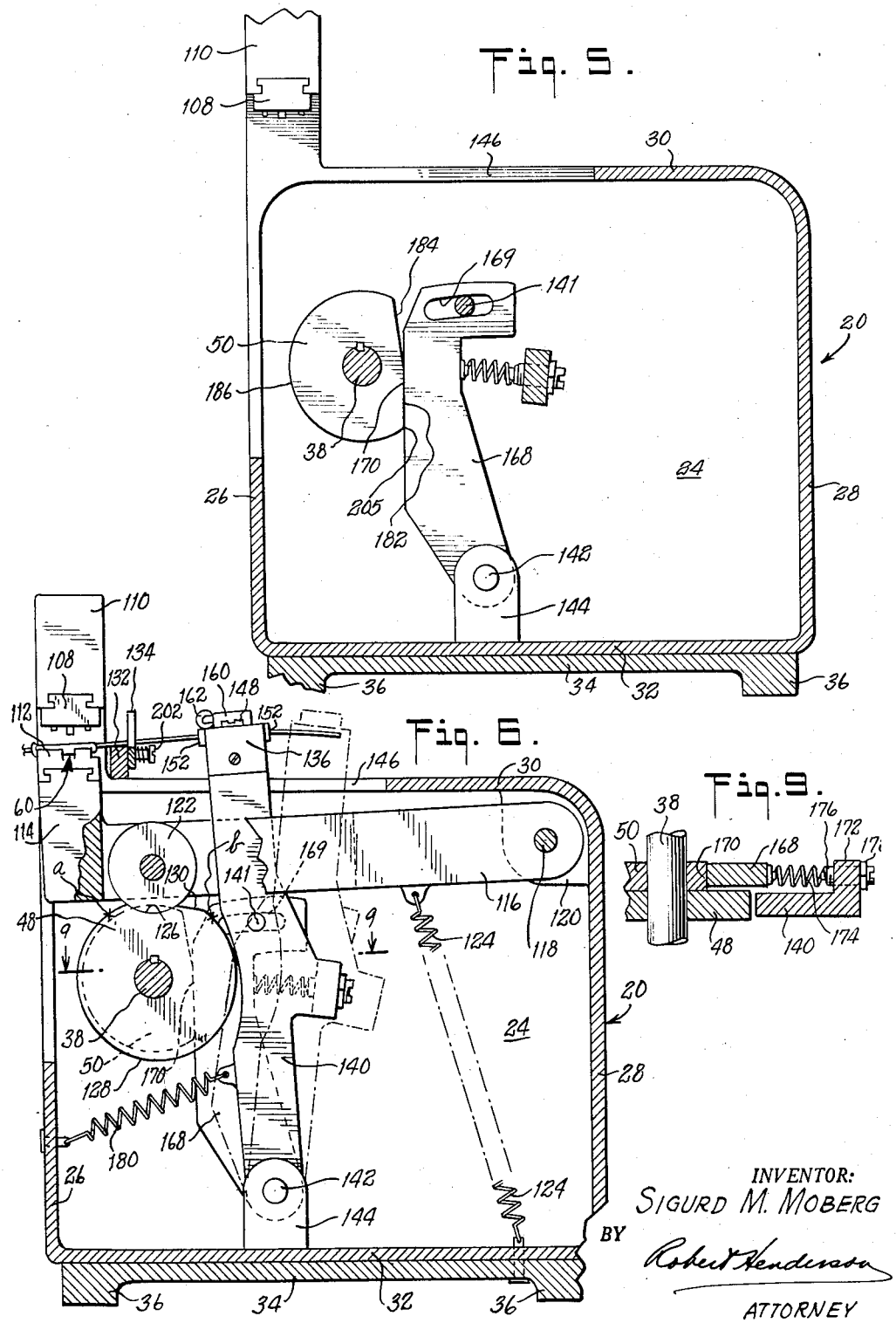

Sept. 30, 1958 S. M. MOBERG 2,854,035
SEALING MACHINE
Filed Sept. 24, 1956 5 Sheets-Sheet 4
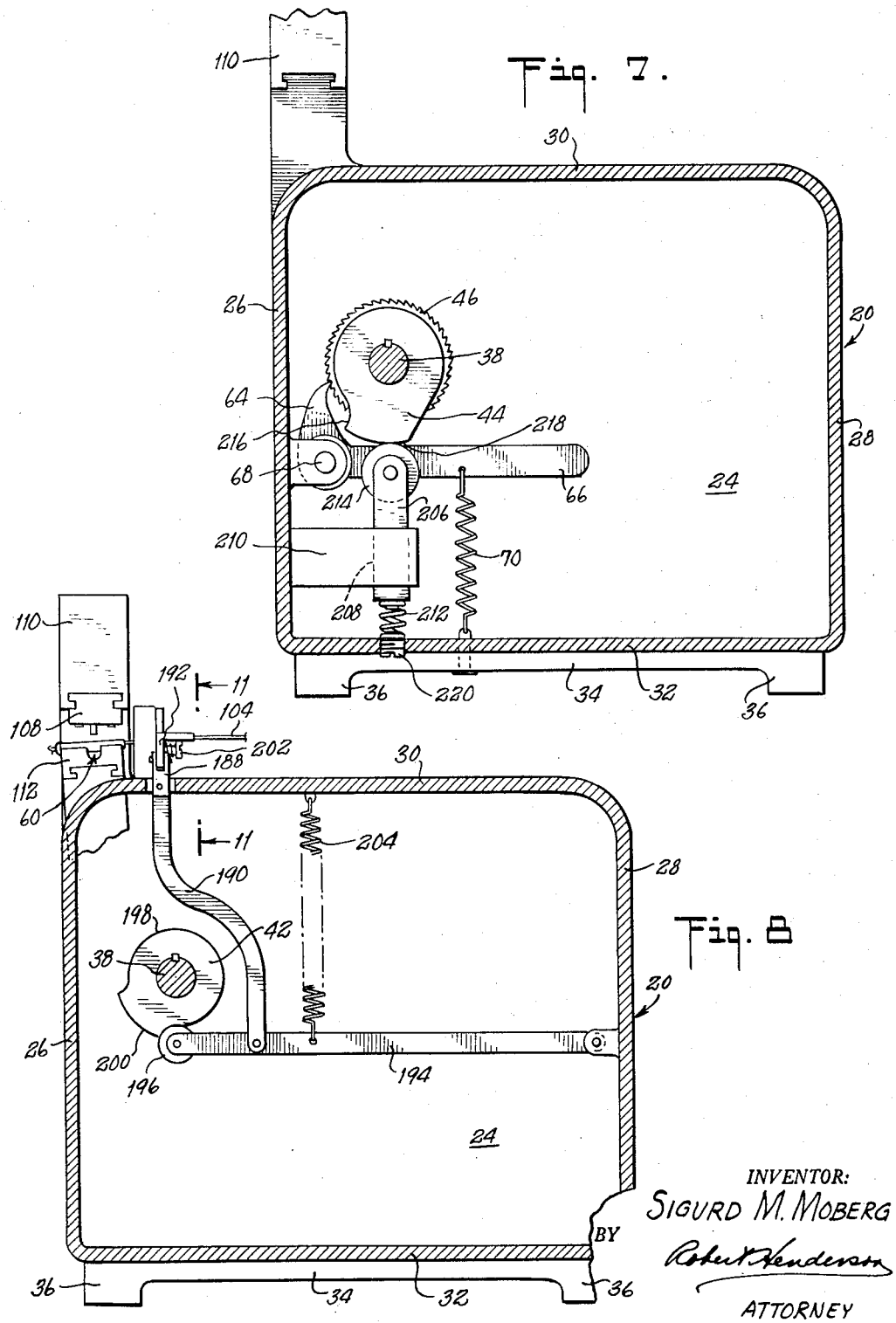
INVENTOR:
SIGURD M. MOBERG
BY
Robert Henderson
ATTORNEY Sept. 30, 1958 S. M. MOBERG 2,854,035
SEALING MACHINE
Filed Sept. 24, 1956 5 Sheets-Sheet 5
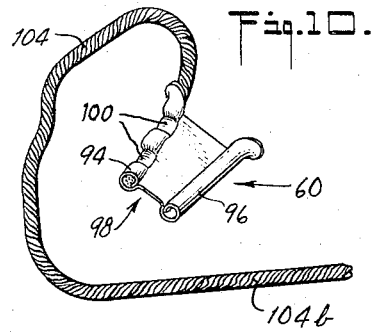
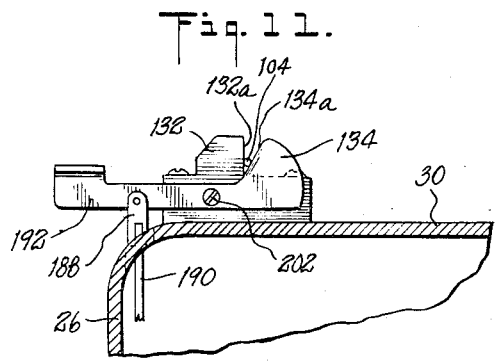
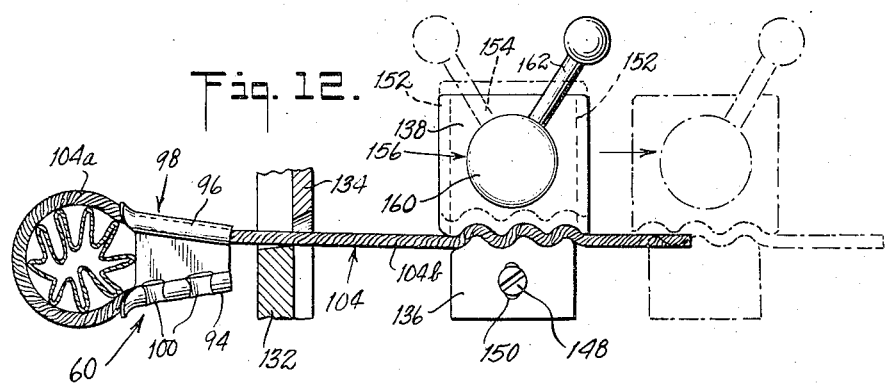
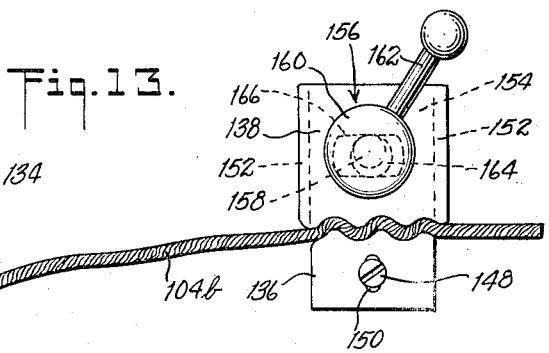
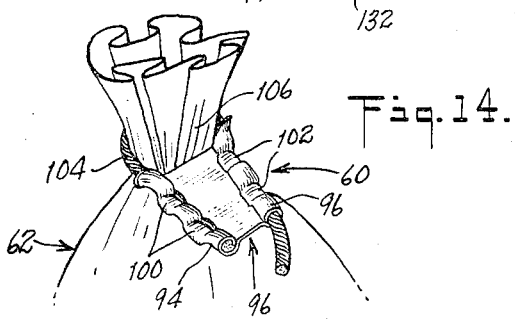
INVENTOR:
SIGURD M. MOBERG
BY Robert Henderson
ATTORNEY

United States Patent Office 2,854,035
Patented Sept. 30, 1958

2,854,035

SEALING MACHINE

Sigurd M. Moberg, Pompton Plains, N. J., assignor to E. J. Brooks Company, Newark, N. J., a corporation of New Jersey Application September 24, 1956, Serial No. 611,661

12 Claims. (Cl. 140—93.4)

This invention relates to a machine for deforming a sealing device by pressing it into an irregular or distorted configuration to cause said device to grip firmly a related band or shackle with which it is associated. Although this machine may be used for thus pressing various kinds of seals, it is disclosed herein, for illustrative purposes, as adapted for use with a bag seal having a shackle which is to be secured tightly about the neck of a bag and a deformable sealing element of sheet metal for sealing the shackle against non-detectable tampering.

An important object of this invention is the provision of such a machine wherein, after initial placing of a sealing device therein, the sealing device is gripped, the shackle is tightened, the sealing element is clinched or deformed to seal the shackle, and the sealing device is released, all without it being necessary for the operator to handle the shackle, or the sealing element or the bag or other article being tied or closed by the shackle.

Another important object is the provision of such a machine which additionally includes means for cutting off excess shackle material after clinching of the sealing element.

Another important object is the provision of such a machine wherein the entire operation, following initial placing of the sealing device therein, is brought about by similar, successive manipulations of a single operating arm.

The foregoing and other more or less obvious objects are accomplished by this invention of which a machine according to a single one of various possible embodiments is shown in the accompanying drawings without, however, limiting the invention to that particular embodiment.

Figure 1:
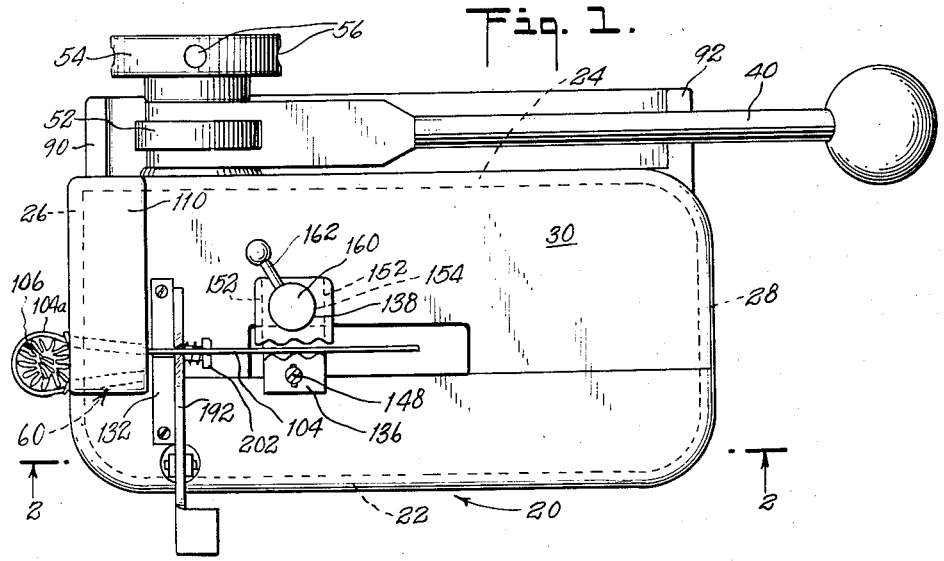
Figure 1 is a top plan view of the machine.
Figure 2:
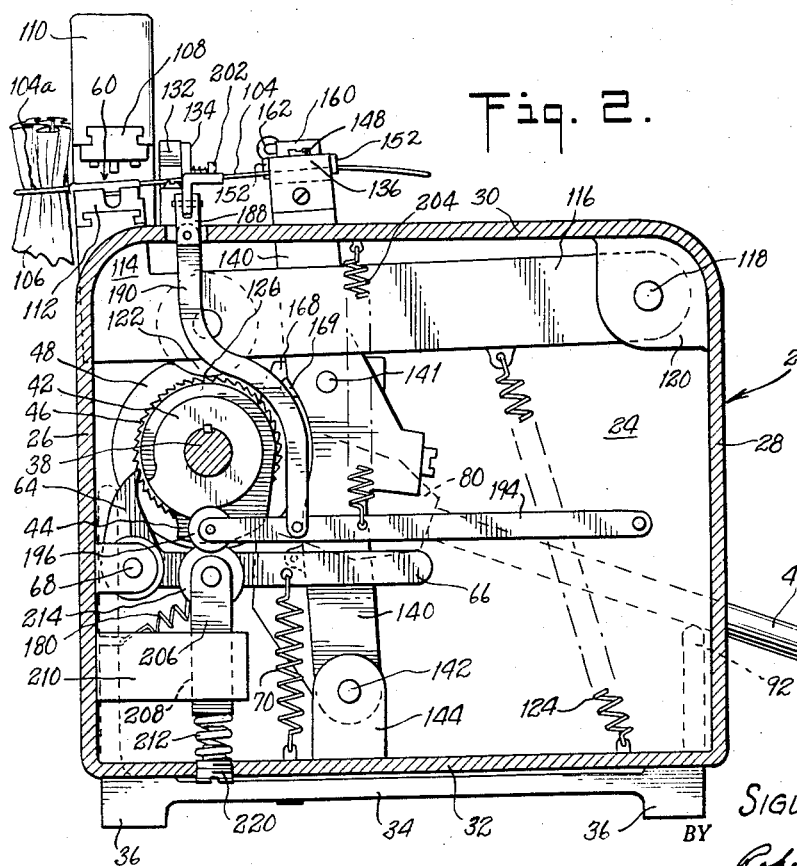
Fig. 2 is a vertical sectional view substantially on the line 2—2 of Fig. 1.
Figure 3:
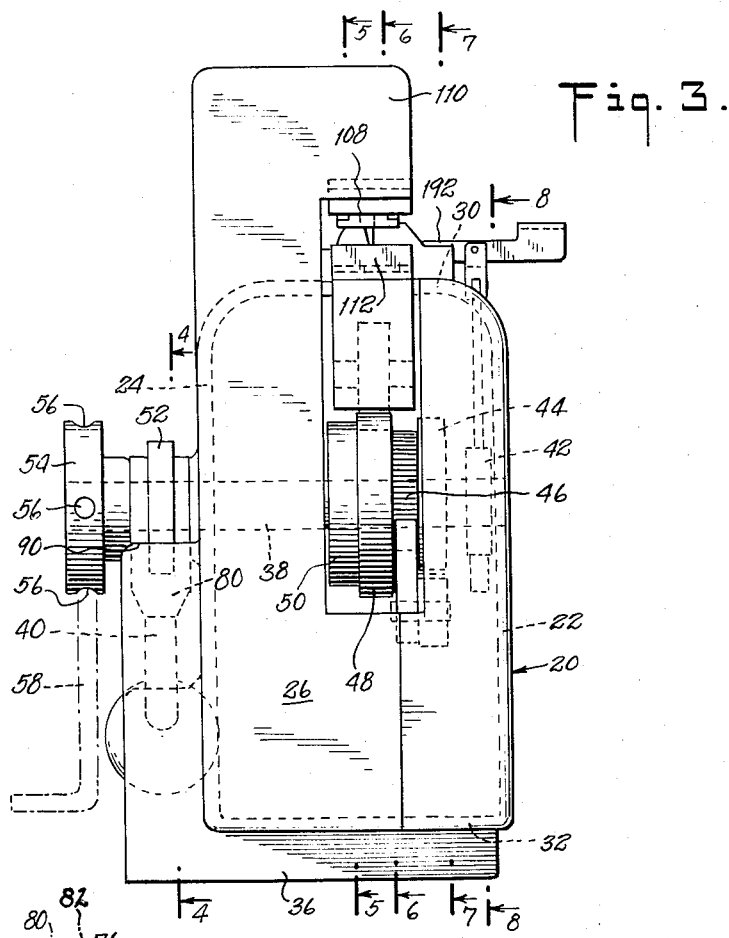
Fig. 3 is an end elevational view of the machine, as viewed from the left side of Fig. 2.

Figs. 4, 5, 6, 7 and 8 are vertical sectional views, respectively, substantially on the lines 4—4, 5—5, 6—6, 7—7 and 8—8 of Fig. 3.

Fig. 9 is a fragmentary sectional view substantially on the line 9—9 of Fig. 6.

Fig. 10 is an enlarged perspective view of a bag sealing device such as may be applied readily to a bag neck by the present machine.

Fig. 11 is a fragmentary, vertical sectional view substantially on the line 11—11 of Fig. 8, showing a shackle cutter which may be incorporated as a part of the machine.

Figs. 12 and 13 are somewhat enlarged, diagrammatic plan views, respectively, illustrating the operation of shackle-tightening means and shackle-cutting means.

Fig. 14 is a perspective view showing a sealing device such as appears in Fig. 10, as applied to a bag neck by the present machine.

The machine shown in the drawings as a preferred embodiment of this invention comprises a box-like casing 20 having a front wall 22, rear wall 24, end walls 26 and 28, top wall 30, bottom 32, and a stand or pedestal 34 having feet 36 by which the machine may rest upon a work-table top; or, if desired, the machine may be suitably bolted down upon a work table.

Journaled in the walls 22 and 24 is a cam-shaft 38, actuated by a manually-operable operating lever 40 carried on the rear end of shaft 38 which protrudes from the rear of said casing. The lever 40 is freely rotatable relatively to the cam-shaft 38 except as hereinafter explained. Rigidly fixed upon the cam-shaft 38 to turn with the latter are (progressing from the front of the machine) a cord-cutter operating cam 42, a brake or shock-absorbing cam 44, an anti-backlash ratchet wheel 46, a die-operating cam 48, and a cord-tightening cam 50, the just-enumerated parts on said cam-shaft all being disposed preferably within the casing 20. On the protruding rear end of the cam-shaft 38 is rigidly fixed a drive or operating ratchet wheel 52, and, on the rear end of the shaft, is rigidly fixed a release wheel 54 having plural holes 56 in its periphery to accommodate an operating wrench 58 for purposes hereinafter explained.

After a seal 60 (Fig. 10), disposed about the neck of a bag 62, has been placed into the machine, the complete operation of the latter is accomplished by three similar, manual, pivotal, driving movements of the operating lever 40 through approximately 186° in each of said movements in a clockwise direction, as viewed in Figs. 2, 4, 5, 6, 7 and 8. The extreme counter-clockwise limit of movement of lever 40 may be seen by reference to the broken-line showing of said lever's hub 80 in Fig. 4 while said lever is shown in full lines in said figure at its extreme clockwise limit of movement. The cam-shaft (but not the operating lever) is limited to such clockwise operational turning by the anti-backlash ratchet wheel 46. The latter is constrained to such clockwise turning by a pawl 64 which is continuously held in engagement with the teeth of said ratchet wheel by an arm 66 which is rigidly associated with the pawl and is spring-biased about the pawl's pivot pin 68 by a tension spring 70 anchored to the bottom wall 32 of the casing.

The drive or operating ratchet wheel 52 is provided with three peripheral notches 72, 74, 76 (Fig. 4); and pivoted at 78 in the hub portion 80 of the operating lever 40 is a pawl 82 having a rigid arm 84 between which and a pin 86 in the hub portion is a tensioned spring 88 which maintains the end of the pawl 82 yieldably against the periphery of the ratchet wheel 52. Thus, the lever 40 turns clockwisely to turn the shaft 38 by coaction of the pawl with said notches but turns counter-clockwisely without turning said shaft. The turning of said lever is limited, counter-clockwisely by a stop 90 and clockwisely by a stop 92; both said stops being a part of or rigidly associated with the machine's casing.

It will be understood that, largely because of the irregular spacing between the notches 72, 74, 76, all cams and wheels rigidly fixed upon cam-shaft 38, in the machine as illustrated, turn with the cam-shaft to the extent of a different number of degrees with at least two of the mentioned three pivotal driving movements of the lever 40 which yield complete operation of the machine. Such complete operation involves turning of the cam-shaft and the cams thereon through 360°. The parts operated by each cam will now be described separately and it should be understood that the angular disposition of the cams on the cam-shaft is such as to yield the operation of the machine according to the timing set forth in the description of over-all operation appearing subsequently herein.

Die-operating cam 48 functions to clinch coil 96 of a metal sealing element 98 of the seal 60 at points 102 firmly upon a shackle shown as a cord 104 which extends tightly about neck 106 of bag 62 to close the latter. For this purpose, the machine includes an upper, stationary die 108, suitably held rigidly in the lower face of an overhanging rigid arm 110 of the casing 20, and a lower, movable die 112, suitably held rigidly in the upper end of an integral extension 114 at the free end of a horizontal arm 116 which is pivoted at 118, at its other end, to an internal lug 120 integral with the machine casing 20.

A cam-following roller 122 on arm 116 coacts with the irregular peripheral cam surface of cam 48 to pivot the arm 116 upwardly and downwardly to cause the dies 108 and 112 to grip and clinch the coil 96 of the sealing element 98 upon the cord 104; the roller 122 preferably being held yieldably against said cam surface by a spring 124 connected under tension between the arm 116 and the bottom wall 32 of the machine casing.

The cam 48 is shown, in Fig. 6, in its angular position as at the beginning (and at the end) of a complete operating cycle as before a first 186° clockwise or operating movement of the operating lever 40. At that time the roller 122 is seated within an arcuate recess or cam portion 126 of cam 48. Clockwise rotation of shaft 38 and all cams thereon occurs to the extent of about 36° as a result of the first 186° clockwise movement of the operating lever 40, whereupon the roller 122 moves out of recess 126 and rests approximately upon point marked *a* on the cam surface of cam 48. As a result of the just-mentioned movement of the cam 48, arm 116 is raised to such an extent as to cause the dies 108 and 112 to grip but not to clinch or materially deform the sealing element 98.

Counterclockwisely from point *a* of cam 48, the peripheral cam surface of cam 48 very gradually assumes a greater radius, relatively to cam-shaft 38, to point *b* to form an eccentric or spiral cam portion 128. A flat cam surface 130 extends from point *b* to the near end of arcuate cam portion 126. The traverse of roller 122 upon spiral cam portion 128 during the greater parts of second and third operating strokes of the lever 40 causes the dies 108 and 112 to deform and clinch coil 96 of the seal tightly upon the cord 104, as shown at 102 in Figs. 13 and 14.

During the latter part of such a third operating stroke of lever 40, the roller 122 moves upon flat cam surface 130, back into arcuate recess 126, thereby restoring the dies 108 and 112 to their fully open condition in readiness for further, similar operation upon another seal.

The function of cord-tightening cam 50 is to operate a cord-tightening mechanism which pulls the cord 104 tightly about the neck 106 of the bag before the sealing element 98 is crimped tightly upon said cord by dies 108 and 112 as already explained. At this point it should be noted that, to prepare a bag 62 for closing at its neck, the free end of cord 104 of seal 60 is first passed through coil 96 of the seal to form a loop 104*a* which is slipped over the neck of the bag (or the cord may be passed about the bag neck and thence through coil 96). Then, with the bag lying against the left end of the machine (Fig. 2), the seal 60 is laid in die 112 which is more or less complementally formed to receive the seal.

The free end of the cord 104 is then placed between shearing members 132, 134 (hereinafter more fully described) and between cord-clamping jaws 136, 138 disposed at the upper end of a cord-tightening arm 140 which is pivoted at its lower end, at 142, to a lug 144 extending upwardly from bottom wall 32 of the machine casing. The arm 140 extends through and is movable back and forth in a slot 146 in top wall 30 of the machine casing so that the jaws 136, 138 are accessible for receipt of the cord.

Jaw 136 is adjustably fixed to the upper end of arm 140 by a machine screw 148 which extends through a slot 150 and is threaded into the upper end of arm 140, thereby enabling jaw 136 to be so positioned relatively to jaw 138 as to enable the two said jaws to grip the cord therebetween when jaw 138 is cammed toward jaw 136. The jaw 138 has depending side skirts 152 extending at opposite sides of an underlying block 154 which is integral with or rigidly fixed to the upper end of arm 140. Thus, the jaw 138 is guided upon the upper end of arm 140 for sliding in a straight line to and from the jaw 136.

A cord-gripping cam member 156 (Fig. 13) comprises integral parts including a stem 158, a disc 160 at the upper end of said stem and overlying the jaw 138, an operating arm 162 extending laterally from said disc, and an eccentric 164 disposed in the plane of the jaw 138 and working in a slot 166 in the latter. The lower end of the stem 158 is suitably journaled in the block 154. It may be seen that with the arm 162 in its leftward broken-line position, shown in Fig. 12, the jaws 136, 138 are open to receive the cord 104, as also shown in broken lines, while clockwise movement of arm 162, to its full-line rightward position in Fig. 12, causes the eccentric 164 to coact with slot 166 to close the jaw 138 tightly upon the cord with a very firm grip.

When the bag 62, sealing element 98 and cord 104 are initially disposed in the machine and the cord gripped in jaws 136, 138 as just explained, the dies 108 and 112 are in their separated or open positions and cord-tightening arm 140 is in its leftward position, all as shown in full lines in Fig. 6. This condition is the machine's condition as at the start of a complete operating cycle and is sometimes hereinafter referred to as the machine's "start condition."

The cord-tightening mechanism, operated by cam 50, may best be understood from Figs. 5, 6 and 9 and comprises, in addition to cord-tightening arm 140, a cam-following arm 168 which is independently pivoted at its lower end at point 142 and has a cam-following surface 170 maintained in engagement with the peripheral cam surface of cam 50. As seen in Fig. 9, the arms 168 and 140 lie closely alongside each other and the latter has an integral, lateral lug 172 extending into the plane of arm 168; and between the latter and the lug 172 is disposed a strong, tightly but not completely compressed spring 174. One end of spring 174 seats upon an end of an adjusting screw 176 for adjusting the compression reaction of said spring, a lock nut 178 being employed, if desired, to lock the adjustment of said screw.

A spring 180, tensioned between casing wall 26 and arm 140, continuously urges the latter yieldably leftwardly and the arm 140, through spring 174, maintains cam-following arm 168 in engagement with cam 50. The arm 140 may be provided with a pin 141 working in an arcuate slot 169 in arm 168 to limit the relative angular movement of the two said arms.

In the start condition of the machine, cam 50 is positioned approximately as shown in Fig. 5, at which time cam surface 170 of arm 168 is in engagement with cam surface 182 of said cam. As previously mentioned, the first clockwise 186° movement of lever 40 turns the shaft 38 and, hence, cam 50 to the extent of about 36°, first bringing cam surface 170 of arm 168 into engagement with a cam surface 184 of said cam, and then moving surface 184 slightly beyond face-to-face contact with surface 170, thereby commencing rightward movement of arms 168 and 140 to start tightening of cord 104 about the neck of the bag 62. The second and third clockwise 186° movements of lever 40 result in two successive clockwise movements of shaft 38 and cam 50 to the extent of about 162° upon each such movement of said lever.

During approximately the first 50° of the first of these 162° movements of cam 50, the cam surface 170 of arm 168 moves further from cam surface 184 and to a concentric cam surface 186 of cam 50, thereby quickly pushing arms 168 and 140 to their most rightward or cord-tightening positions, shown in broken lines in Fig. 6, whereby arm 140 pulls cord 104 taut. However, the condition that spring 174 permits arm 140 to yield is a condition which prevents the pull on the cord from being sufficient to break it; the adjusting screw 176, of course, being set to enable the spring 174 thus to function.

During the continuance of engagement of camming surfaces 170 and 186, throughout the remainder of the second operating stroke of lever 40 and throughout all but the last 60° more or less of the third operating stroke of said lever, the cord 104 is held taut while the dies 108, 112 deform or clinch the sealing element 98 as already explained and until said cord is cut off as hereinafter explained. During about the last 60° of the third operating stroke of lever 40, the cam 50 permits arms 168 and 140 to return to their most leftward positions in readiness for sealing of another bag seal by the machine.

After deforming or clinching of the sealing element 98 has been substantially completed at least to such an extent that the cord 104 cannot recede within coil 96 and thereby loosen loop 104a, it may be desired to cut off the free end 104b of said cord at a point quite close to the seal 60. If this is desired, the machine may then include a cutting mechanism operated by the cam 42.

Such a cutting mechanism may include already-mentioned shearing members 132 and 134 and means for operating the latter to derive a shearing action. Such shear-operating means, as herein disclosed, comprise links 188 and 190 which are universally pivoted between an actuating arm 192 of shearing member 134 and a cam-following arm 194 which is pivoted at one end to casing wall 28 and has a roller 196, at its other end, arranged to follow peripheral cam surfaces 198, 200 of cam 42.

The shearing member 134 is pivoted upon a pivot screw 202 to oscillate in relation to shearing member 132, and a tension spring 204 connected between top casing wall 30 and arm 194 continuously urges the latter and its roller 196 yieldably into engagement with cam surfaces 198 and 200. During the greater part of a complete turn of cam 42, the roller 196 rolls upon cam surface 198 and spring 204 holds apart the cutting edges 132a and 134a of the shearing members 132 and 134 as in Fig. 11. Toward the end of a complete turn of cam 42 from its start position, the raised cam portion 200 swings arm 194 downwardly, thereby causing cutting edge 134a to move toward cutting edge 132a to shear the cord 104 disposed therebetween. This occurs just about as the die 112 reaches its upper limit of movement to complete clinching of sealing element 98 and while the cord-tightening arm 140 is at or near its extreme rightward position holding cord 104 taut.

In the mechanism, as thus far described, the movement of the cord-tightening cam's cam surface 186 out of engagement with surface 170 of arm 168 and movement of surface 182 into engagement with surface 170 brings about an abrupt, substantial leftward shifting of arms 168 and 140. Unless opposed, such abrupt shifting would occur because, at about the time that the juncture point 205, between said cam's surfaces 186 and 182, moves to a location just below the level of the axis of the cam-shaft, the strong force with which spring 180 urges arm 168 leftwardly tends to quickly and substantially accelerate the forward rotation of cam 50, which rotation, of course, is not materially restrained by the pawl 64 and ratchet wheel 46. Thus, the acceleration of the cam 50 at the stated time would permit the arms 168 and 140 to shift almost instantaneously from their most rightward to their most leftward positions and set up undesirable shock and vibration in the machine, unless means are provided to prevent such instantaneous shifting.

To prevent or minimize such instantaneous shifting and the objectionable results thereof, it is preferred to oppose or brake such shifting. One way of doing this is illustrated in the drawings, particularly in Fig. 7, wherein a plunger 206, guided for vertical sliding in a bore 208 in a lug 210 of casing wall 26, is yieldably urged upwardly by compression spring 212 to cause a roller 214 on the upper end of said plunger to follow the periphery of cam 44 which constitutes a cam surface. Said cam surface has a ramp 216 leading onto a raised cam surface 218.

At the time when the force of spring 180 is operative, as already explained, through arms 140 and 168 to cause acceleration of cam 50 with resultant instantaneous, shock-producing shifting of the two latter arms leftwardly, the spring-biased plunger 206 through its roller 214 is pressing against ramp 216 to oppose rotation of cam 44 and thereby oppose such shock-producing, instantaneous shifting of the arms 140 and 168. The result is that shock is minimized to unobjectionable proportions or is substantially eliminated. Adjustment of spring 212 may be provided by means of an adjusting screw 220 to derive most effective adjustment of the described shock-absorbing mechanism. Also, the design of ramp 216 may be somewhat varied to achieve a particular, desired shock-absorbing effect.

Although rotation of cam-shaft 38 through 360° to derive the described operation probably could be achieved satisfactorily through use of a motor suitably geared to said cam-shaft and having an automatic cut-off arrangement, the preference of users of a machine of the kind disclosed herein leans toward manual operation. Additionally, a motor-driven machine would be quite expensive to produce and would probably necessitate the incorporation into the machine of various safety expedients beyond those which suffice in a manually operated machine. For these reasons, the present illustrative embodiment of the invention is disclosed as arranged for manual operation.

Figure 4:
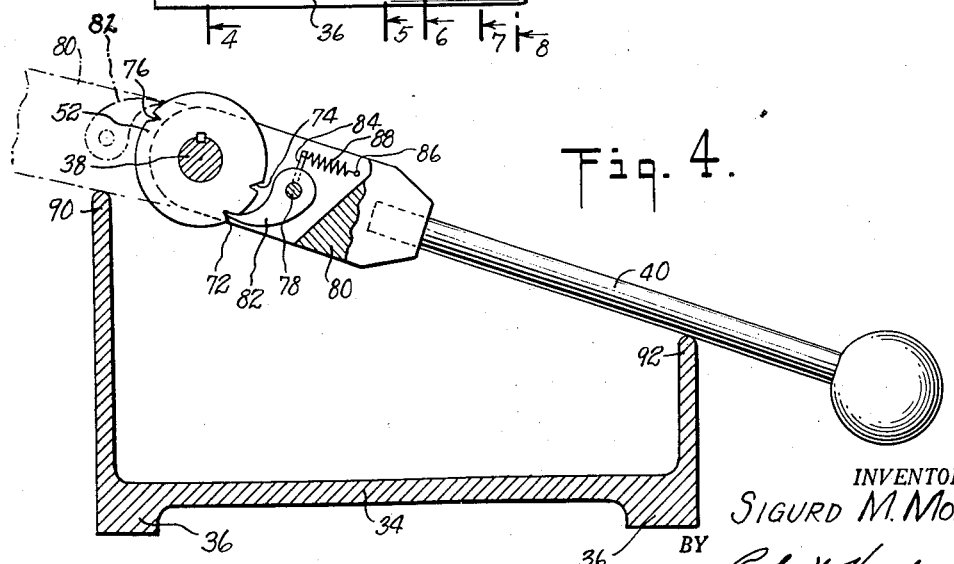

The operation of the manually operative means, of which the parts have already been described, may best be understood from Fig. 4 from which it will be seen that, when the operating lever 40, which is not keyed to cam-shaft 38, is in its broken-line position and operating ratchet wheel 52 is in its start position as indicated in said figure, the end of pawl 82 is beyond or in a clockwise direction from notch 76. Then, upon clockwise movement of lever 40, the latter moves through about 150° without any resultant turning of cam-shaft 38, until the pawl engages notch 74, whereupon the continued movement of lever 40 throughout the remaining approximately 36° of its clockwise stroke causes the ratchet wheel 52 to turn clockwisely to the extent of about 36°. Thereafter, the lever 40, after being returned to its broken-line position, is pivoted in a second clockwise stroke of about 186° and then is again returned and given a third clockwise stroke of about 186°.

On the mentioned second clockwise stroke of lever 40, the pawl 82 engages notch 76 to turn the camshaft clockwisely by about 162° and, on the third clockwise stroke of said lever, the pawl 82 engages notch 72 to turn the cam-shaft again to the extent of about 162°, at which point the cam-shaft and the various cams thereon will have turned through 360° in a complete cycle of operation. The effect of these successive movements of the cams 42, 44, 48 and 50 through 36°, 162° and 162° has already been explained.

The release wheel 54 is suitably keyed to the cam-shaft 38. It affords an operator means by which he, using wrench 58 in holes 56 of said wheel, may release the cam-shaft if any jamming of the machine should occur during operation.

In Fig. 10, the coil 94 is shown as being clinched at 100 upon the shackle 104. Such clinching may advantageously be done at the factory where the sealing device is manufactured to assure that the shackle will not become separated from the metal sealing element 98 before the device is applied to a bag. In such an arrangement, the dies 108, 112 may but need not necessarily include formations to register with clinched portions 100 to more tightly clinch the latter in addition to formations for deforming or clinching the coil 96 of the metal sealing element at 102. On the other hand, the seal manufacturer may leave coil 94 wholly undeformed and may merely knot one end of the shackle at coil 94 or employ suitable equivalent means for keeping the shackle and the metal sealing element together; in which arrangement the dies 108, 112 would necessarily include formations for clinching the coils 94 and 96 both at 100 and at 102.

It is believed that one may understand, from the foregoing description, the manner in which a bag and seal may be placed in the machine and in which three successive clockwise strokes of lever 40 cause gripping of a metal sealing element, tightening of a seal's cord about a bag neck, clinching of the sealing element tightly upon the cord, and, if desired, cutting away of an excess part of the cord.

It should be obvious that the concepts disclosed herein may be utilized in various other ways without, however, departing from the invention as set forth in the following claims.

I claim:

1. A sealing machine for use in tightening a shackle and clinching a metal sealing element upon the shackle, said machine comprising a cam-shaft and means for turning the latter, a die mechanism adapted to grip such a metal sealing element and, subsequently, to deform said sealing element to clinch it upon a shackle associated therewith, a shackle-tightening arm having means thereon for fixing a shackle portion thereto, a die-operating cam on and constrained to turn with said cam-shaft and adapted to operate said die mechanism, and a shackle-tightening cam on and constrained to turn with said cam-shaft and adapted, in response to turning of the latter, to operate said shackle-tightening arm subsequent to gripping of said sealing element by said die mechanism and prior to material deformation of the sealing element by said die mechanism.

2. A sealing machine for use in tightening a shackle and clinching a metal sealing element upon the shackle, said machine comprising a cam-shaft and means for turning the latter, a die mechanism adapted to grip such a metal sealing element and, subsequently, to deform said sealing element to clinch it upon a shackle associated therewith, a shackle-tightening mechanism, a die-operating cam on and constrained to turn with said cam-shaft and adapted to operate said die mechanism, and a shackle-tightening cam on and constrained to turn with said cam-shaft and adapted to operate said shackle-tightening mechanism subsequent to gripping of said sealing element by said die mechanism and prior to material deformation of the sealing element by said die mechanism; the mechanism operated by one of said cams having a portion yieldably coacting with said one cam, and the latter and the cam-shaft tending to be turned suddenly at one point in the rotation of said cam-shaft in response to the force applied by said portion to said one cam, and the machine further including a shock-absorbing cam on and constrained to turn with said cam-shaft and a spring-pressed follower coacting with an eccentric surface on the shock-absorbing cam to oppose such sudden turning of the cam-shaft.

3. A sealing machine according to claim 1, further including a follower coacting with and deriving movement from said shackle-tightening cam during rotation of the latter, and yieldable force-transmitting means operatively disposed between said follower and said shackle-tightening arm to enable the latter to yield sufficiently to prevent breaking of the shackle.

4. A sealing machine for use in tightening a shackle and clinching a metal sealing element upon the shackle, said machine comprising a cam-shaft and means for turning the latter, a die mechanism adapted to grip such a metal sealing element and, subsequently, to deform said sealing element to clinch it upon a shackle associated therewith, a shackle-tightening mechanism, a die-operating cam on and constrained to turn with said cam-shaft and adapted to operate said die mechanism, and a shackle-tightening cam on and constrained to turn with said cam-shaft and adapted to operate said shackle-tightening mechanism subsequent to gripping of said sealing element by said die mechanism and prior to material deformation of the sealing element by said die mechanism; the said shackle-tightening mechanism comprising a pivotal follower arm having a portion in engagement with said shackle-tightening cam to derive actuation positively from the latter cam, a pivotal shackle-tightening arm having means toward its free end for gripping the shackle, and a compressible spring operatively disposed between said two arms and adapted to transmit the motion of the follower arm yieldably to the shackle-tightening arm, thereby enabling the latter to pull the shackle taut without breaking it.

5. A sealing machine for use in tightening a shackle and deforming a metal sealing element to clinch it upon the shackle, said machine comprising a cam-shaft and means for turning the latter unidirectionally, die means for gripping and deforming said sealing element, a first cam constrained to turn in response to turning of said cam-shaft and adapted to operate said die means initially to cause the latter to grip the sealing element and subsequently to cause the die means to deform said sealing element, shackle-tightening means including means for gripping the shackle prior to tightening of the latter, and a second cam constrained to turn in response to turning of said cam-shaft and adapted to operate said shackle-tightening means to tighten the shackle; said second cam being timed to tighten the shackle subsequent to gripping of the sealing element by said die means and prior to material deformation of the sealing element by said die means.

6. A sealing machine comprising a rotary member and means for turning the latter, means responsive to turning of said rotary member for first gripping and subsequently deforming a sealing element to clinch the latter upon a shackle, and means responsive to turning of said rotary member for tightening the shackle; the last-mentioned means being timed to tighten the shackle subsequent to such gripping of the sealing element and prior to material deformation of the sealing element.

7. A sealing machine according to claim 6, the means for gripping and deforming the sealing element comprising two relatively movable gripping and deforming members adapted to engage the sealing element therebetween, and an actuating element constrained to move in response to turning of said rotary member and coacting with a movable one of said gripping and deforming members to cause the two latter members to grip and deform the sealing element therebetween.

8. A sealing machine according to claim 6, the means for tightening the shackle comprising a shackle gripper adapted to grip a portion of the shackle at a distance from the sealing element, a movable shackle-pulling member having said shackle gripper fixed thereto, and an actuating element constrained to move in response to turning of said rotary member and coacting with said shackle-pulling member to move the latter to tighten the shackle while the sealing element is held by said gripping and deforming means.

9. A sealing machine according to claim 6, the rotary member being a cam-shaft, the gripping and deforming means comprising a pair of relatively movable dies and a die-operating cam on and constrained to turn with said cam-shaft for operating said dies, and the shackle-tightening means comprising a movable shackle-gripping member and a shackle-tightening cam on and constrained to turn with said cam-shaft for moving the shackle-gripping member away from said dies whereby to tighten a shackle associated with said sealing element and gripped by said gripping member.

10. A sealing machine for tightening a shackle and deforming and clinching a metal sealing element upon the shackle, said machine comprising a casing, a cam-shaft rotatably supported in said casing, means operatively disposed between the casing and the cam-shaft to limit the latter substantially to unidirectional rotation, an operating lever on said cam-shaft and freely pivotable about the latter's axis in one direction and having a drive connection operatively disposed between said lever and the cam-shaft for driving the latter in its one direction of rotation, said lever being limited to driving strokes each of less than 360° whereby plural driving strokes of the lever are required to give the cam-shaft a complete 360° turn, a pair of dies for gripping and deforming a metal sealing element therebetween, means on said casing for stationarily supporting one of said dies, a die-carrying arm pivotally carried by said casing and having a portion adapted to hold the other of said dies, a die cam on and constrained to turn with the cam-shaft and having a first cam-surface portion adapted to coact with said arm during a first driving stroke of said operating lever to pivot said arm and thereby move said other die into position wherein the pair of dies grips the metal sealing element and a second cam-surface portion adapted to coact with said arm during a second and a third driving stroke of said operating lever to pivot said arm to gradually move the latter and said other die to cause the pair of dies substantially to deform said sealing element therebetween, a shackle-tightening arm pivotally carried by said casing and having means thereon for gripping a shackle which extends through said sealing element, and a shackle-tightening cam on and constrained to turn with the cam-shaft and having a cam-surface portion adapted to coact with the shackle-tightening arm to move the latter away from the metal sealing element at the time the latter is gripped and in an initial stage of deformation by said dies whereby to tighten a shackle gripped by the gripping means on the shackle-tightening arm.

11. A sealing machine according to claim 10, further including yieldable force-transmitting means operatively disposed between the shackle-tightening cam and the shackle-tightening arm to cause the latter to move yieldably in coaction with the shackle-tightening cam.

12. A sealing machine according to claim 10, further including shock-absorbing means carried by the casing and a cam on and constrained to turn with the cam-shaft and adapted to coact with said shock-absorbing means to oppose movement of the cam-shaft tending to override movement of the latter by said operating lever.

References Cited in the file of this patent

UNITED STATES PATENTS

| | | |
|---|---|---|
| 2,267,532 | Moberg | Dec. 23, 1941 |
| 2,364,543 | Moore | Dec. 5, 1944 |
| 2,764,861 | Wenk | Oct. 21, 1956 |